(12) United States Patent
Park

(10) Patent No.: US 9,804,765 B2
(45) Date of Patent: Oct. 31, 2017

(54) CONTROLLING METHOD OF SCREEN LOCK AND ELECTRONIC DEVICE SUPPORTING THE SAME

(71) Applicant: Samsung Electronics Co., Ltd., Gyeonggi-do (KR)

(72) Inventor: Taegun Park, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 386 days.

(21) Appl. No.: 14/189,209

(22) Filed: Feb. 25, 2014

(65) Prior Publication Data

US 2014/0289683 A1 Sep. 25, 2014

(30) Foreign Application Priority Data

Mar. 22, 2013 (KR) .................. 10-2013-0030797

(51) Int. Cl.
*G06F 3/0486* (2013.01)
*G06F 3/0488* (2013.01)
(52) U.S. Cl.
CPC ................... *G06F 3/0488* (2013.01)
(58) Field of Classification Search
CPC ....................................................... G06F 3/0488
See application file for complete search history.

(56) References Cited

U.S. PATENT DOCUMENTS

| 7,479,949 | B2* | 1/2009 | Jobs | G06F 3/0488 345/169 |
|---|---|---|---|---|
| 2011/0316797 | A1* | 12/2011 | Johansson | G06F 3/04883 345/173 |
| 2012/0009896 | A1* | 1/2012 | Bandyopadhyay | G06F 1/1643 455/411 |
| 2012/0174042 | A1* | 7/2012 | Chang | G06F 3/04883 715/863 |
| 2013/0082945 | A1* | 4/2013 | Jo | H04M 1/67 345/173 |
| 2013/0260720 | A1* | 10/2013 | Miyaki | H04W 12/08 455/411 |
| 2014/0033326 | A1* | 1/2014 | Chien | H04W 12/08 726/28 |

OTHER PUBLICATIONS

AppleEnergySaver, Nov. 4, 2008.*

* cited by examiner

*Primary Examiner* — Matthew Ell
*Assistant Examiner* — Mohamed Abou El Seoud
(74) *Attorney, Agent, or Firm* — Cha & Reiter, LLC

(57) ABSTRACT

A method and apparatus for a configurable screen lock are disclosed herein, including receiving a request to release the screen lock while the electronic device is in a screen lock state, and in response to the request, displaying on a display a screen lock setting screen enabling adjustment of at least one execution condition of the screen lock.

20 Claims, 6 Drawing Sheets

CONTROLLING METHOD OF SCREEN LOCK AND ELECTRONIC DEVICE SUPPORTING THE SAME

CROSS-REFERENCE TO RELATED APPLICATION

This application claims priority from and the benefit under 35 U.S.C. §119(a) of Korean Patent Application No. 10-2013-0030797, filed on Mar. 22, 2013, which is hereby incorporated by reference for all purposes as if fully set forth herein.

TECHNICAL FIELD

The present disclosure relates to an operation of an electronic device, and more particularly, to a screen lock operation of an electronic device.

BACKGROUND

Electronic devices may support complex operations implementing various user functions because of the continued development of hardware technology. An electronic device may support, for example, a screen lock function. The screen lock function may serve to generally protect against unintentional touch inputs on the screen by a user.

SUMMARY

The present disclosure provides a method and apparatus for an improved screen lock function, and an electronic device supporting the same.

An example embodiment of the present disclosure provides a method of controlling a screen lock, including receiving a request to release the screen lock while the electronic device is in a screen lock state, and in response to the request, displaying on a display a screen lock setting screen enabling adjustment of at least one execution condition of the screen lock.

Another example embodiment of the present disclosure provides a method of controlling a screen lock, including receiving a screen lock release request in a screen lock state, and displaying a screen lock setting screen including an item of adjusting an execution condition of the screen lock.

Yet another example embodiment of the present disclosure provides an electronic device, a display, and a processor configured to receive a request to release the screen lock while the electronic device is in a screen lock state, and in response to the request, display on the display a screen lock setting screen enabling adjustment of at least one execution condition of the screen lock. Still yet another example embodiment of the present disclosure provides an electronic apparatus, including a display unit for displaying a screen lock setting screen including an item of adjusting an execution condition of screen lock, and a controller for controlling output of the screen lock setting screen when receiving a lock release request is received in a screen lock state.

As described above, according to the method of controlling screen, and the electronic device supporting the same of the present disclosure, it is possible to provide a configurable screen lock.

BRIEF DESCRIPTION OF THE DRAWINGS

Elements of the present disclosure will be more apparent from the following detailed description in conjunction with the accompanying drawings, in which.

DETAILED DESCRIPTION

Hereinafter, example embodiments of the present disclosure will be described in detail with reference to the accompanying drawings.

In describing the example embodiments of the present disclosure, descriptions related to technical contents which are well-known in the art to which the present disclosure pertains, and is not directly associated with the present disclosure, will be omitted. Moreover, detailed descriptions related to configuration elements having substantially identical configurations and functions will be omitted.

For the same reason, in the accompanying drawings, some configuration elements may be exaggerated, omitted, or schematically shown, and a size of each element may not precisely reflect the actual size. Accordingly, the present disclosure is not restricted by a relative size or interval shown in the accompanying drawings.

Figure 1:
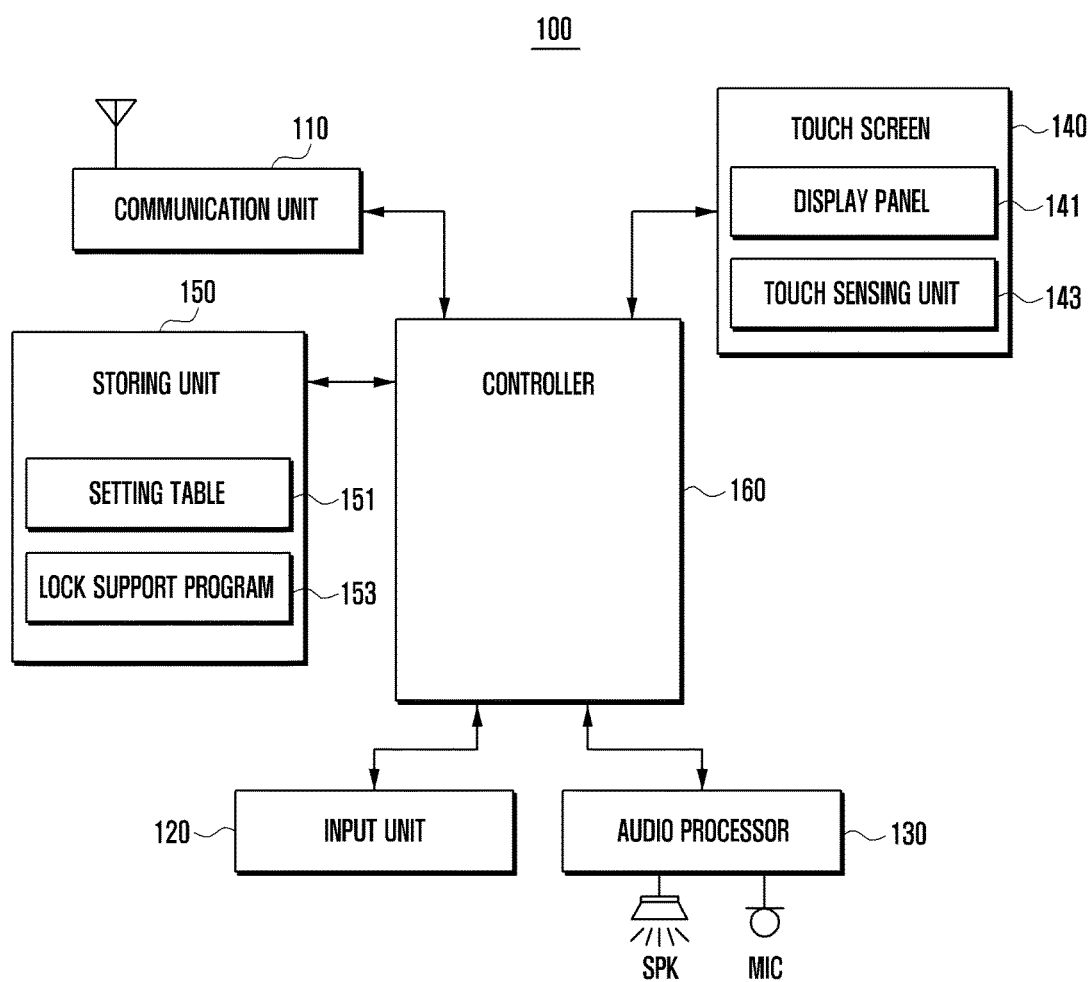
FIG. 1 is a diagram schematically illustrating a configuration of an electronic device supporting a screen lock control function according to an example embodiment of the present disclosure.

FIG. 1 is a diagram schematically illustrating a configuration of an electronic device supporting a screen lock control function according to an embodiment of the present disclosure.

Referring to FIG. 1, an electronic device 100 may include a communication unit 110, an input unit 120, an audio processing unit 130, a display unit 140, a storing unit 150, and a controller 160.

The electronic device 100 including the aforementioned configuration may enter a screen lock state when a specific event is not generated for a predetermined time (i.e., no inputs are received for a predetermined amount of time), or an input event for executing the screen lock state is generated (i.e., manual triggering of the screen lock state). The screen lock state may be a state wherein a lock state is provided on the display unit 140. The screen lock state may further include modes where, for example, a touch sensing unit 143 is deactivated, or, in some cases, power to the display panel 141 is discontinued. A screen lock release standby state may be a state in which a lock-set screen is displayed on the display unit 140 according to generation of a screen release event. The screen release event may be, for example, a specific key event for turning on the display unit 140, or generation of an external communication input event or a scheduled execution event. In this state, power may be supplied to the display unit 140.

The screen lock release state is a state in which the aforementioned screen lock is released. Accordingly, the screen lock release state may be a state in which a specific function screen according to a request of a user or a specific screen set as a default is output on the display unit 140. In the screen lock release state, the electronic device 100 may identify a screen lock execution condition, and when the corresponding execution condition is satisfied, the electronic device 100 may execute the screen lock. The electronic device 100 may be changed to the screen lock release standby state or the screen lock state according to the execution of the screen lock. In this process, the electronic device 100 may first perform an operational process of adjusting brightness of the display unit 140, and then discontinue the supply of the power to the display unit 140 when a predetermined time elapses without generation of a separate event. Further, the electronic device 100 may be changed to the screen lock state when the predetermined time elapses without the generation of the separate event after blocking the power of the display unit 140 or immediately after blocking the power.

The present disclosure may support variously adjusting the execution condition of the aforementioned screen lock according to a selection of the user. Further, the present disclosure discloses the condition for the execution of the screen lock in the aforementioned screen lock release state, thereby facilitating certain user operations of the electronic device 100. Further, the present disclosure may allow the user to more adaptively perform the screen lock setting, thereby supporting other screen lock controls.

The communication unit 110 supports a communication function of the electronic device 100 by forming at least one communication channel for an application that may require communication, such as a message service function, a web page searching function, a video communication function, a voice communication function, a data transceiving function, or a cloud function, of the electronic device 100. The communication unit 110 may include a mobile communication module when the electronic device 100 supports a mobile communication function. Further, the communication unit 110 may include a broadcasting receiving module when the electronic device 100 supports a broadcasting receiving function. When the communication unit 110 forms a specific communication channel and receives data through the corresponding communication channel, the received data may be provided to the controller 160. If the screen lock is executed (such as, for example, when a predetermined time elapses without having received an input) and the present operations are in a state where there are no separate input events or data receiving events current in the operation of the communication unit 110, the communication unit 110 may be changed to an inactive state by the controller 160. If this is not performed, the communication unit 110 may remain in an activated state and update, for example, a web page which loaded immediately before the execution of the screen lock, even though the screen lock is executed, thereby wasting resources.

The input unit 120 is configured to generate various input signals necessary for the operation of the electronic device 100. The input unit 120 may be formed in a specific key type, such as a button key, a side key, and a home key. The input unit 120 may generate an input signal requesting the screen lock release in a state where the screen lock is executed according to a request of the user. Further, the input unit 120 may generate an input signal requesting the execution of the screen lock in a state where the screen lock is released according to a request of the user.

In the meantime, when the display unit 140 is formed in a touch screen type supporting a touch function, the input unit 120 may include a configuration of the display unit 140. A touch event generated in the display unit 140 may be transmitted to the controller 160, and the controller 160 may apply the touch event to a currently executed application. The screen lock may be released by the touch event generated in the display unit 140. Particularly, the screen lock execution condition may be adjusted by at least one of a drag direction, a drag distance, and a drag speed of the touch event generated in the display unit 140.

The audio processor 130 is configured to process various audio signals generated during the operation of the electronic device 100. For example, the audio processor 130 may include a speaker SPK for supporting output of an audio signal generated or decoded in the electronic device 100, and further, may include a microphone MIC capable of collecting an audio signal for supporting a voice communication or video communication function, a recording function, and the like.

In the meantime, when an event for changing the screen lock state to the screen lock release standby state is generated, the audio processor 130 may support outputting of a guide sound or an effect sound according to generation of the corresponding event. Further, when the screen lock is released in the screen lock release standby state according to the generation of the event, the audio processor 130 may support outputting of the guide sound or the effect sound according to the release of the screen lock. Further, when a screen lock state is executed (due to, for example, lapse of a predetermined time without generation of a separate event in the screen lock release state, such that power supply to the display unit 140 is discontinued, or the screen lock release state is changed to the screen lock release standby state, or the screen lock state), the audio processor 130 may support audial output of the guide sound or the effect sound according to the change. The aforementioned output of the guide sound or the effect sound may be omitted according to a configuration setting by the user, or may not be supported according to an intent of a hardware or software designer.

The display unit 140 is configured to output various function screens necessary for operating the electronic device 100 of the present disclosure. For example, the display unit 140 may output a menu image, a specific application operation screen, a plurality of application operation screens, or a full screen of a specific application among a plurality of operated applications. The display unit 140 of the present disclosure may output, for example, a screen lock release standby state screen, a previously performed specific application screen, or an idle screen according to the release of the screen lock, and the like. The screen lock release idle screen output on the display unit 140 may be outputted as any one between the screen lock setting screen and a basic lock screen. The screen lock setting screen may be a screen on which the screen lock execution condition may be adjusted. Accordingly, the screen lock execution condition may be adjusted according to at least one among a direction, a distance, and a speed of the touch event generated for the release of the screen lock in a state where the screen lock setting screen is output. The basic lock screen may be a screen provided when the screen lock execution condition is in a default configuration. When the screen lock is released in a state where the basic lock screen is being output, the screen lock execution condition set as the default is operated to support the execution of the screen lock. A display interface provided by the aforementioned display unit 140 will be described in more detail with reference to the drawings to be described below.

The aforementioned display unit 140 may include a touch sensing unit 143 and a display panel 141 for supporting an input function. Further, the display unit 140 may also include a pen touch sensing unit (not illustrated) for operating an electronic pen. The touch sensing unit 143 may be a panel for sensing a physical or electrical change by a finger touch of a user in a capacitance manner, a resistive layer manner, and the like. The touch sensing unit 143 is disposed on at least one place between a front surface and a rear surface of the display panel 141 to provide location information by a touch of a user's finger and contact or approach gesture information according to a movement of a finger to the controller 160. At least one piece of information about a direction, a distance, and a speed of a touch event generated by the touch sensing unit 143 is provided to the controller 160, and the information may be used for the release of the currently executed screen lock.

The display panel 141 is a region in which screen constituent elements are output. The display panel 141 is mapped to the touch sensing unit 143 so that various screen constituent elements are output. For example, the display panel 141 may output an operation screen of a specific application among a plurality of current operated applications. The display panel 141 may be applied to various display panels, such as a liquid crystal display panel implementing a screen by using light provided from backlight, and an OLED implementing a screen by using self-emitted light. When the display panel 141 is changed to the screen lock state, the power supply thereof may be adjusted. For example, when a predetermined time elapses without generation of a separate event in a state where a specific screen is provided, a level of power supplied to the display panel 141 may be reduced. Accordingly, the display panel 141 may output a screen with a lower intensity of illumination. Further, when a predetermined time elapses without generation of the event, the power supply to the display panel 141 may be discontinued.

Here, in the electronic device 100, even though the power supply to the display panel 141 is blocked, the power supply to the touch sensing unit 143 may be maintained. Further, when a specific event is sensed by the touch sensing unit 143 within a predetermined time, the electronic device 100 may restore the power supply to the display panel 141. In the meantime, when a predetermined time elapses after the discontinuation of the power supply to the display panel 141, the power supply to the touch sensing unit 145 is also discontinued, the electronic device 100 thereby entering the screen lock state. When a specific input signal causing the electronic device 100 to enter the screen lock state is generated, the electronic device 100 may directly enter the screen lock state without a separate phase of control inputs received via the display panel 141 and the touch sensing unit 143.

In an example where the electronic device 100 of the present disclosure is lacks, for example, at least one of a touch input function (by bodily contact or by a stylus), the display unit 140 may be implemented utilizing a configuration that does not include at least one of the touch sensing unit 143 and the pen touch sensing unit. If the electronic device is designed to utilize touch inputs from a stylus or pen only, the touch event for adjusting the screen lock execution condition may be generated by the operation of a stylus pen and a pen touch sensing unit.

The storing unit 150 may store various application programs necessary for the operation of the electronic device 100, and various application data generated during the operation of the electronic device 100. For example, the storing unit 150 may store a program such as an operation system necessary for the operation of the electronic device 100. The storing unit 150 may store a lock support program 153 and a setting table 151 for supporting the execution and the release of the screen lock.

The lock support program 153 may include a routine for executing the screen lock, a routine for releasing the screen lock, and a routine for setting the screen lock.

The routine for executing the screen lock may include a timer control subroutine for controlling at least one timer, an operation subroutine for operating a timer according to the screen lock execution condition information, and a subroutine for changing to the screen lock state when the timer is stopped. Herein, the subroutine for the executing the screen lock may include a process for controlling an additional operation of the timer, controlling adjustment and discontinuation of power to the display panel 141, and deactivation of the touch sensing unit 143 before the change to the screen lock state in response to the timer being stopped.

The routine for releasing the screen lock may include a subroutine for detecting an event generated in the screen lock state, and an output subroutine for outputting the lock screen on the display unit 140 according to the collected event. The output subroutine may include yet another routine providing the screen lock setting screen and a routine providing the basic lock screen. Further, the routine for releasing the screen lock may include a routine for collecting the screen lock execution condition information according to at least one among a direction, a distance, and a speed of a touch event generated when the screen lock is released, and a routine for updating the setting table 151 based on the collected information.

The routine for setting the screen lock may include a screen lock basic mode supporting routine providing the screen lock according to a default configuration setting, and a screen lock setting mode supporting routine for adjusting the setting of the screen lock according to, for example, at least one of a direction, a distance, or a speed of a touch event. Further, the routine for setting the screen lock may include a separate menu supporting routine for setting the screen lock execution condition.

The setting table 151 is a table storing the screen lock execution condition information adjusted according to the screen lock execution condition. The setting table 151 may include at least one of default or modified configuration setting information, a selection of the direction of the touch event, a distance of the touch event, and a direction of the touch event.

The controller 160 is configured to support processing of various signals and data related to the operation of the electronic device 100 of the present disclosure. That is, the controller 160 may support the execution of the screen lock, the provision of the lock screen, and the management of the screen lock execution condition. To this end, the controller 160 may include a configuration illustrated in FIG. 2.

Figure 2:
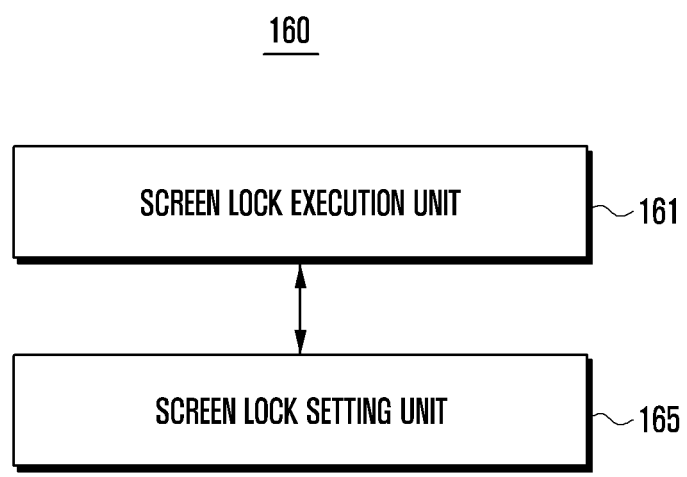
FIG. 2 is a diagram illustrating an example configuration of a controller of FIG. 1 in more detail.

FIG. 2 is a diagram illustrating an example configuration of the controller 160 according to an embodiment of the present disclosure.

Referring to FIG. 2, the controller 160 of the present disclosure may include a screen lock executing unit 161 and a screen lock setting unit 165.

The screen lock execution unit 161 may control the execution of the screen lock. In this case, the screen lock execution unit 161 may drive the timer in a state where the function screen is outputted on the display unit 140. Further, when the timer is stopped, the screen lock execution unit 161 may cause the electronic device 100 to enter the screen lock state. Here, the screen lock execution unit 161 may drive a plurality of timers, and reduce the power supply to the display unit 140 when a first timer is stopped, and discontinue the power supply to the display unit 140 when a second timer is stopped. Further, the screen lock execution unit 161 may discontinue power supply to the touch sensing unit 143 and cause the electronic device 100 to enter the screen lock state when a third timer is stopped. In this case, the screen lock execution unit 161 may perform a time adjustment of each timer based on the information stored in the setting table 153.

When a specific event is generated in the screen lock state, the screen lock setting unit 165 cause output of the screen lock release idle screen. For example, when a home key input event is generated in the screen lock state, the screen lock setting unit 165 may cause display of the lock screen on the display unit 140. In this case, the screen lock setting unit 165 may cause the display of at least one of the screen lock setting screen and the basic lock screen on the display unit 140 dependent upon a current situation. For example, when an event for the releasing the screen lock is generated within a predetermined time after the change to the screen lock state, the screen lock setting unit 165 may cause the screen lock setting screen to be output as the screen lock release idle screen. Further, when an event for initially releasing the screen lock is generated within a predetermined time, the screen lock setting unit 165 may cause output of the screen lock setting screen.

The screen lock setting unit 165 collects at least one among a direction, a distance, and a speed of a touch event generated in a state where the screen lock setting screen or the basic lock screen is output. Further, the screen lock setting unit 165 may adjust the screen lock executing condition based on a state of the currently output lock screen, and at least one among the direction, the distance, and the speed of the touch event. That is, the screen lock setting unit 165 may cause the setting table 151 is updated.

Figure 3:
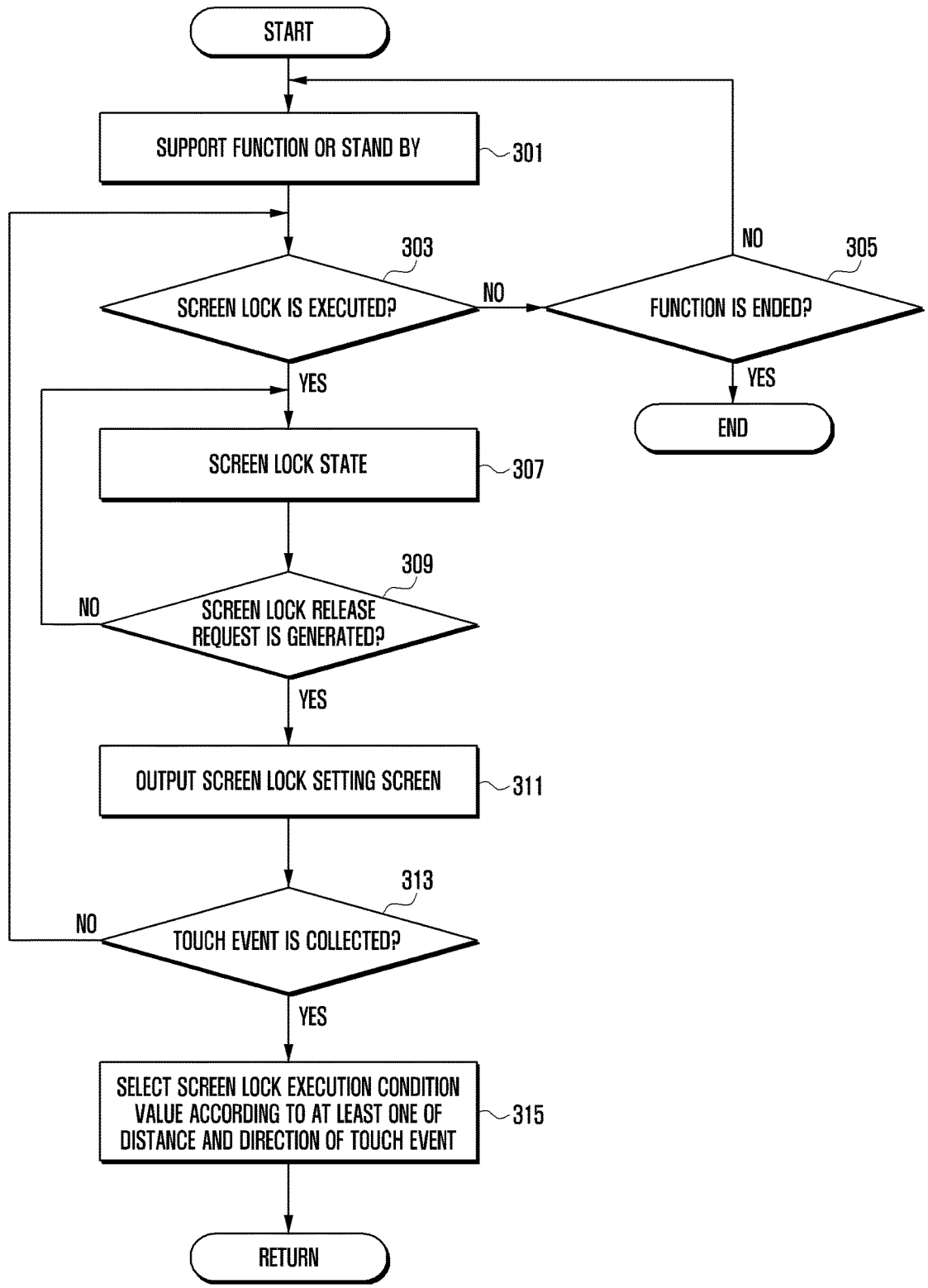
FIG. 3 is a flowchart illustrating an example sequence of steps for controlling a screen lock according to an embodiment of the present disclosure.

FIG. 3 is a flowchart illustrating an example sequence of steps for supporting the screen lock function according to an embodiment of the present disclosure.

Referring to FIG. 3, the controller 160 of the electronic device 100 may support a specific application function, or stand by for supporting an application function in operation process 301. The controller 160 may perform various functions including a specific application function, such as, for example, a broadcasting receiving function, a video reproducing function, a file editing function, and a file searching function, etc., according to a request of a user. The controller 160 may support output of an idle screen or a screen in which a specific icon or a menu is arranged in operation process 301.

The controller 160 may identify whether a condition for execution of the screen lock is generated in operation process 303. For example, the controller 160 may identify whether a predetermined time limit for the execution of the screen lock is terminated. In order to support the identification, the controller 160 may operate the timer and reset the timer when a specific event is generated, enabling detecting of whether the set time was terminated without generation of a separate event. Further, the controller 160 may identify whether a specific key input signal allocated for the execution of the screen lock is generated. The controller 160 may also identify whether a previously defined specific gesture event or a specific external input signal for the execution of the screen lock is received. When the condition for the execution of the screen lock is not satisfied, the controller 160 may proceed to operation process 305 and identify whether a specific event for ending the function is generated. Further, when the specific event for ending the function is not generated, the controller 160 may return to operation process 301 and re-perform the operation process or processes. Here, the ending of the function may be an event for turning off the electronic device 100.

When the condition for the execution of the screen lock is satisfied in operation process 303, the controller 160 may proceed to operation process 307 to enter the screen lock state. For example, when a predetermined time elapses without generation of a separate event during the performance of operation process 307, the controller 160 may first execute a power adjustment step, where the screen lock state may be in one embodiment a state in which power is discontinued to the display unit 140, and generation of an event through the display unit 140 is limited.

Next, the controller 160 may identify whether a screen lock release request event is generated in operation process 309. Here, the generation of the event corresponding to the screen lock release request may include detecting of an event requested performance of a specific communication function, and reception of a specific input event for releasing the screen lock. To this end, the electronic device 100 may allocate a key for releasing the screen lock. For example, when the controller 160 receives an input event related to the home key, an input event related to a key provided in a toggle form for executing the screen lock and releasing the screen lock, or a similar input, the controller 160 may detect the input event as the screen lock release request. When the request for releasing the screen lock is not generated, the controller 160 proceeds before operation process 307 and may maintain the screen lock state.

In the meantime, when the request for releasing the screen lock is generated in operation process 309, the controller 160 may proceed to operation process 311 and output the screen lock setting screen. Here, the screen lock setting screen may be a screen suggesting a screen lock execution condition differently applied according to at least one of a direction, a distance, and a speed of the event for releasing the screen lock or a specific event. The screen lock setting screen may also be a screen including a plurality of regions capable of setting the screen lock execution condition. The controller 160 may enable power supply to the display unit 140 for displaying the screen lock setting screen.

Next, the controller 160 identifies whether a touch event is collected in operation process 313. In this process, when a predetermined time elapses without generation of a separate touch event, the controller 160 may return to operation process 303 to determine the electronic device to be in the screen lock execution state, and enter operation process 307. In the meantime, when a specific touch event is generated in operation process 313, the controller 160 collects information about at least one of a direction, a distance, and a speed of the corresponding touch event. Further, the controller 160 may proceed to operation process 315 and select a screen lock execution condition value according to at least one of the distance and the direction of the touch event, and support the release of the screen lock. Here, the controller 160 may detect whether the screen lock is released according to the form of the touch event, which may be, for example, a touch drag distance, the number of touch taps, or a direction of the touch drag. A screen lock execution condition value may then be selected according to the direction of the corresponding touch event when a distance value in a degree of releasing the screen lock is detected. Further, the controller 160 may store the screen lock execution condition value in the setting table 151.

The controller 160 may return to operation process 301 to identify the screen lock execution condition value written in the setting table 151, and identify whether the corresponding screen lock execution condition is satisfied while supporting a specific application function.

The screen lock setting screen for differently adjusting the screen lock execution condition according to the touch event may be provided as a default when the request for releasing the screen lock is generated. Further, the screen lock setting screen may be provided when a specific type of application is executed and then enters the screen lock state. For example, when the electronic device 100 performs a video function or a web page display function and then enters the screen lock state, the screen lock setting screen may be output according to the type of application being executed when the screen lock release is requested. Otherwise, the screen lock setting screen may be output when an initial screen lock release request is generated in a predetermined time interval. For example, the controller 160 may output the screen lock setting screen when an initial event for releasing the screen lock is generated for every time interval of 10 minutes or one hour. Otherwise, after setting a menu requesting the output of the screen lock setting screen, when the initial screen lock releasing request is generated, the controller 160 may output the screen lock setting screen.

Figure 4:
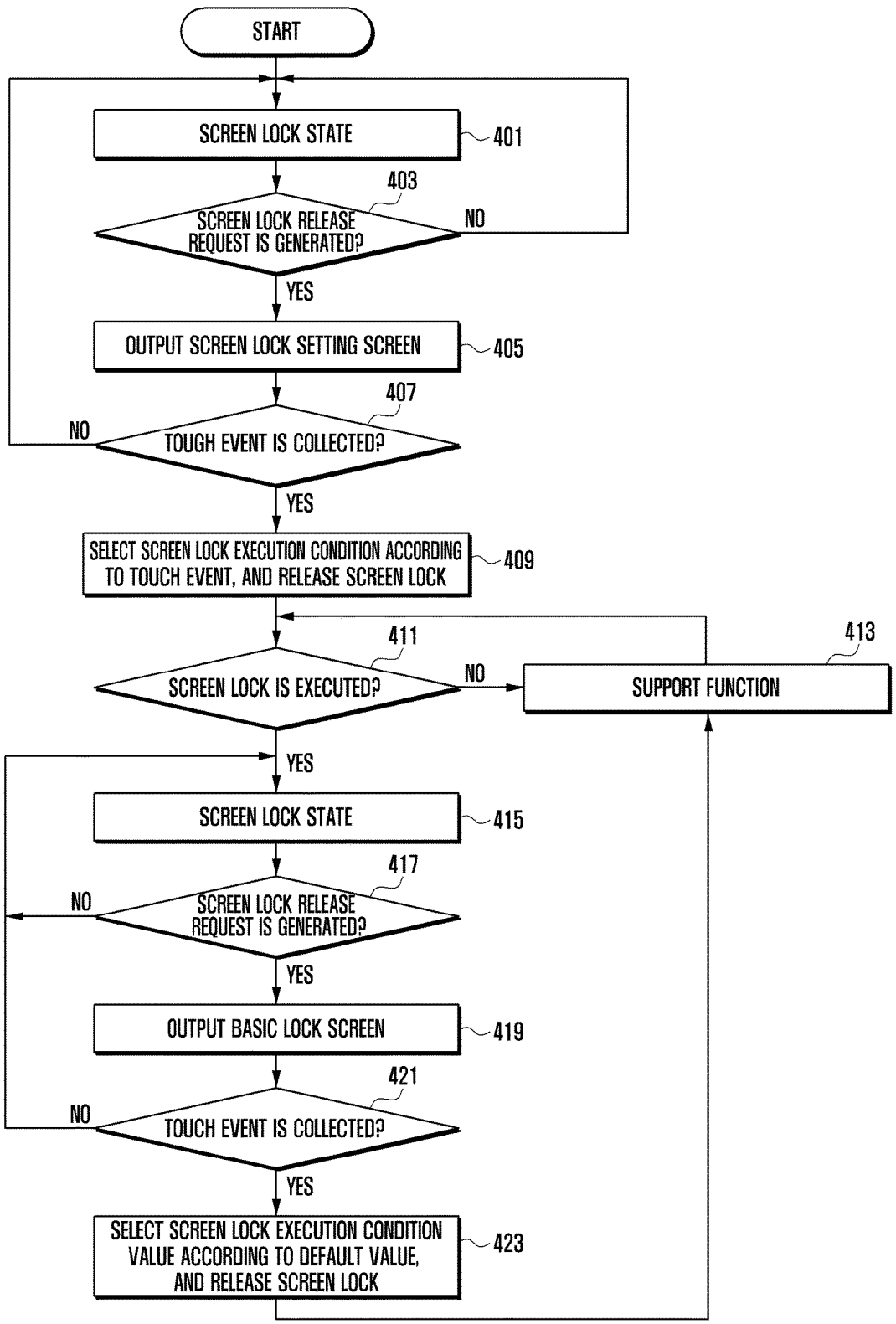
FIG. 4 is a flowchart illustrating an example sequence of steps for controlling a screen lock according to another embodiment of the present disclosure.

FIG. 4 is a flowchart illustrating an example sequence of steps for implementing a screen lock function according to another embodiment of the present disclosure.

Referring to FIG. 4, in the method of controlling the electronic device of the present disclosure, the electronic device 100 may be in a screen lock state in operation process 401. For example, when an input event for entering the screen lock state is generated (via a button press on, for example, a power button), or a predetermined time elapses without generation of a separate event (i.e., no inputs are detected for a certain time period), the controller 160 of the electronic device 100 may cause the electronic device 100 to enter the screen lock state. The screen lock state may, for example discontinue power supply to the display unit 140 so that generation of inputs on the display unit 140 are suppressed.

Next, the controller 160 identifies whether a screen lock release request is generated in operation process 403. When there is no screen lock release request, the controller 160 may return to operation process 401 and maintain the screen lock state. When a request for releasing the screen lock is generated in operation process 403, the controller 160 may then proceed to operation process 405 and output a screen lock setting screen, in which a screen lock execution condition may be changed. The screen lock setting screen will be described in more detail with reference to a display interface below.

When the screen lock setting screen is provided, the controller 160 may identify whether a touch event is collected in operation process 407. In this step, when a predetermined time elapses without detection of the touch event or a specific key input event, the controller 160 may return to operation process 401 and re-perform the operation processes of step 401. When the touch event is detected in operation process 407, the controller 160 may proceed to operation process 409 and detect selection of a screen lock execution condition value and screen lock release according to the touch event. Here, the controller 160 may select a specific screen lock execution condition value according to at least one of a direction, a distance, and a speed of the touch event.

Next, the controller 160 may proceed to operation process 411 and identify whether a condition for executing the screen lock is satisfied. In this step, when the separate condition for executing the screen lock is not satisfied, the controller 160 may proceed to operation process 413, and support a specific function according to the screen lock release (that is, for example, continue execution of an application that was running before the electronic device entered a screen lock state). For example, the controller 160 may support performance of at least one function among various functions, such as an application function that was being executed immediately before the electronic device 100 entered the screen lock state, an application function of which activation is requested according to a request of a user, and an application function activated according to a received specific event received. The controller 160 may proceed to operation process 411 and identify whether a condition for executing the screen lock is generated. For example, the controller 160 may identify whether a corresponding timer has ended by operating the timer, or examining whether an input event for the screen lock execution is generated while supporting the performance of the application function. When the event for supporting the application function is generated, the controller 160 may reset the timer. Here, an end time of the timer set by the controller 160 may be a value corresponding to the screen lock execution condition value set in operation process 409.

In the meantime, when the screen lock execution condition value set in operation process 409 is equal to or larger than a previously defined predetermined time, the controller 160 may control so as not to support a timer reset function. That is, when the screen lock execution condition value set in operation process 409 is a relatively very long time, such as 1 hour or 2 hours, the controller 160 may support so as not to support the timer reset function and count for independently executing the screen lock. Further, when the corresponding time completely elapses, the controller 160 may also support so that the corresponding electronic device 100 is changed to be in the screen lock state. The electronic device 100 of the present disclosure is changed to the new screen lock state, so that the execution condition selected in the screen lock setting screen is automatically changed by the controller 160 to a default condition.

In the meantime, when the condition for the screen lock execution is satisfied in operation process 411, the controller 160 may proceed to operation process 415 and cause the electronic device 100 to enter the screen lock state. The screen lock state in operation process 415 may be the same state as the screen lock state in operation process 401. Next, the controller 160 may identify whether an event corresponding to the screen lock release request is generated in operation process 417, and when the screen lock release request is generated, the controller 160 may proceed to operation process 419 and output a basic lock screen. The basic lock screen may be a screen supporting detection of a touch event for the screen lock release. When the screen lock is released in a state where the basic lock screen is provided, the controller 160 may apply the screen lock execution condition value set as the default to the setting table 151.

When the basic lock screen is output, the controller 160 may perform detection of the touch event in operation process 421, and when the touch event is detected, the controller 160 may proceed to operation process 423 and support the selection of the screen lock execution condition value according to the default value and the screen lock release. To this end, the touch event generated in operation process 421 may have a distance or direction value of the touch event in a degree capable of releasing the screen lock. If the touch event is of a degree insufficient to release the screen lock, a separate touch event is not generated, or an input event for entering the screen lock state is generated in operation process 421, the controller 160 may reperform the operation process 415. Further, when there is no screen lock release request in operation process 417, the controller 160 may support to return to operation process 415.

As described above, the electronic device 100 of the present disclosure may determine a type of lock screen to be output next according to the type of previously output lock screen. That is, when there is history detailing the previous screen lock setting screen that was output, and the screen lock state release request is generated, the electronic device 100 may output the basic lock screen on the display unit 140. Further, when there is history recording the previous basic lock screen that was last output, and the screen lock state release request is generated, the electronic device 100 may output the screen lock setting screen on the display unit 140.

In the meantime, after operation process 423, the controller 160 may proceed to operation process 413 and support a specific application function.

Figure 5:
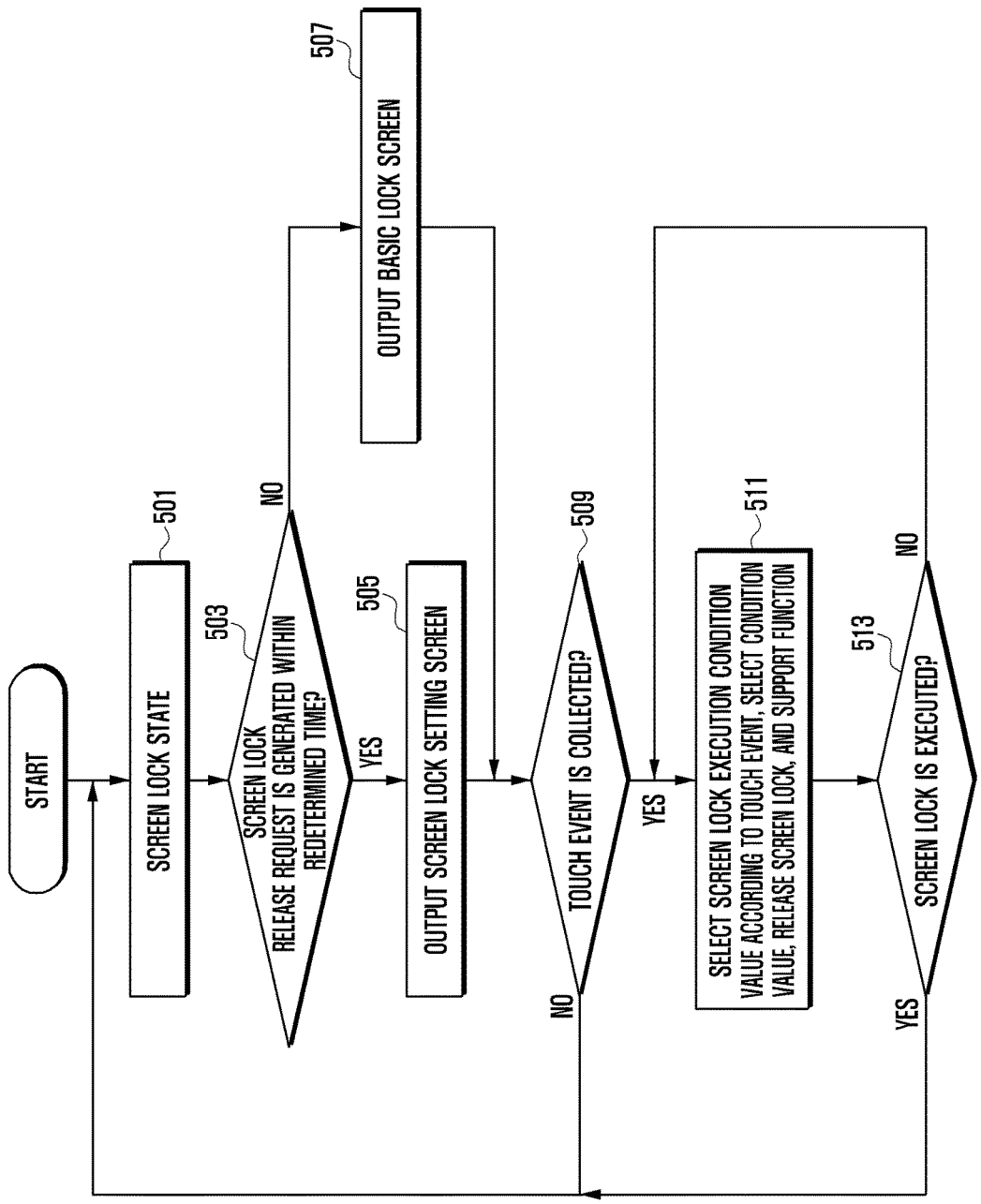
FIG. 5 is a flowchart illustrating an example sequence of steps for controlling a screen lock according to yet another embodiment of the present disclosure.

FIG. 5 is a flowchart illustrating an example sequence of steps for controlling a screen lock function according to yet another embodiment of the present disclosure.

Referring to FIG. 5, the electronic device 100 may be in a screen lock state in operation process 501. Then, the controller 160 of the electronic device 100 may identify whether a screen lock release request is generated within a predetermined time in operation process 503. That is, the controller 160 may identify whether the request for releasing the screen lock is generated within the predetermined time after the electronic device 100 enters the screen lock state. Here, the screen lock release request may be detection of an event of a home key, a power key, or a specific gesture. In order to detect the specific gesture event, the electronic device 100 may further include at least one sensor, such as a motion sensor. Further, the electronic device 100 may store and manage previously mapped gesture information for the screen lock release request.

When the screen lock release request is generated within the predetermined time in operation process 503, the controller 160 may proceed to operation process 505 and output a screen lock setting screen on the display unit 140. In this case, the controller 160 supply power to the display unit 140 in the screen lock state and operate the screen lock setting screen. Conversely, when the screen lock release request is generated after the predetermined time in operation process 503, the controller 160 may proceed to operation process 507 and output a basic lock screen on the display unit 140. When a separate screen lock release request is not generated in operation process 503, the controller 160 may maintain operation process 501.

When the specific lock screen is output on the display unit 140 according to the performance of operation process 505 or operation process 507, the controller 160 may detect whether a touch event occurs in operation process 509. When a specific touch event or a touch event having a predetermined value or more is not detected in operation process 509, the controller 160 may return to operation process 501. Alternatively, when the touch event having a predetermined value of releasing the screen lock or larger is detected in operation process 509, the controller 160 may proceed to operation process 511 and support selection of a screen lock execution condition and the screen lock release according to the touch event, and support an application function according to the screen lock release. Here, the controller 160 may identify a characteristic of a screen output on the display unit 140 just before the screen lock release, and select and operate a screen lock execution condition value according to at least one of a direction, a distance, and a speed of the touch event generated when the screen lock is released according to the characteristic of the corresponding screen. For example, when the screen lock is released in a state where the screen lock setting screen is output on the display unit 140 according to the performance of operation process 505, the controller 160 may select a screen lock execution condition value corresponding to at least one among the direction, the distance, and the speed of the touch event. Further, when the screen lock is released in a state where the screen lock setting screen is output on the display unit 140 according to the performance of operation process 507, the controller 160 may select a screen lock execution condition value set as a default.

Next, the controller 160 may identify whether a condition for executing the screen lock is satisfied in operation process 513. Further, when the condition for executing the screen lock is not satisfied in operation process 513, the controller 160 may return to operation process 511. Alternatively, when the condition for the screen lock execution is satisfied in operation process 513, the controller 160 may proceed to operation process 501 and control the electronic device 100 so as to enter the screen lock state.

The aforementioned electronic device 100 of the present disclosure identifies a time at which a user requests for the screen lock release after entering the screen lock state, thereby supporting the user to more adaptively adjust a screen lock execution time.

The aforementioned provision of the screen lock setting screen may also be set through a separate menu item. That is, the screen lock setting screen may be displayed by a default when the lock screen is provided on the display unit 140 through a user selection of a menu item.

Figure 6:
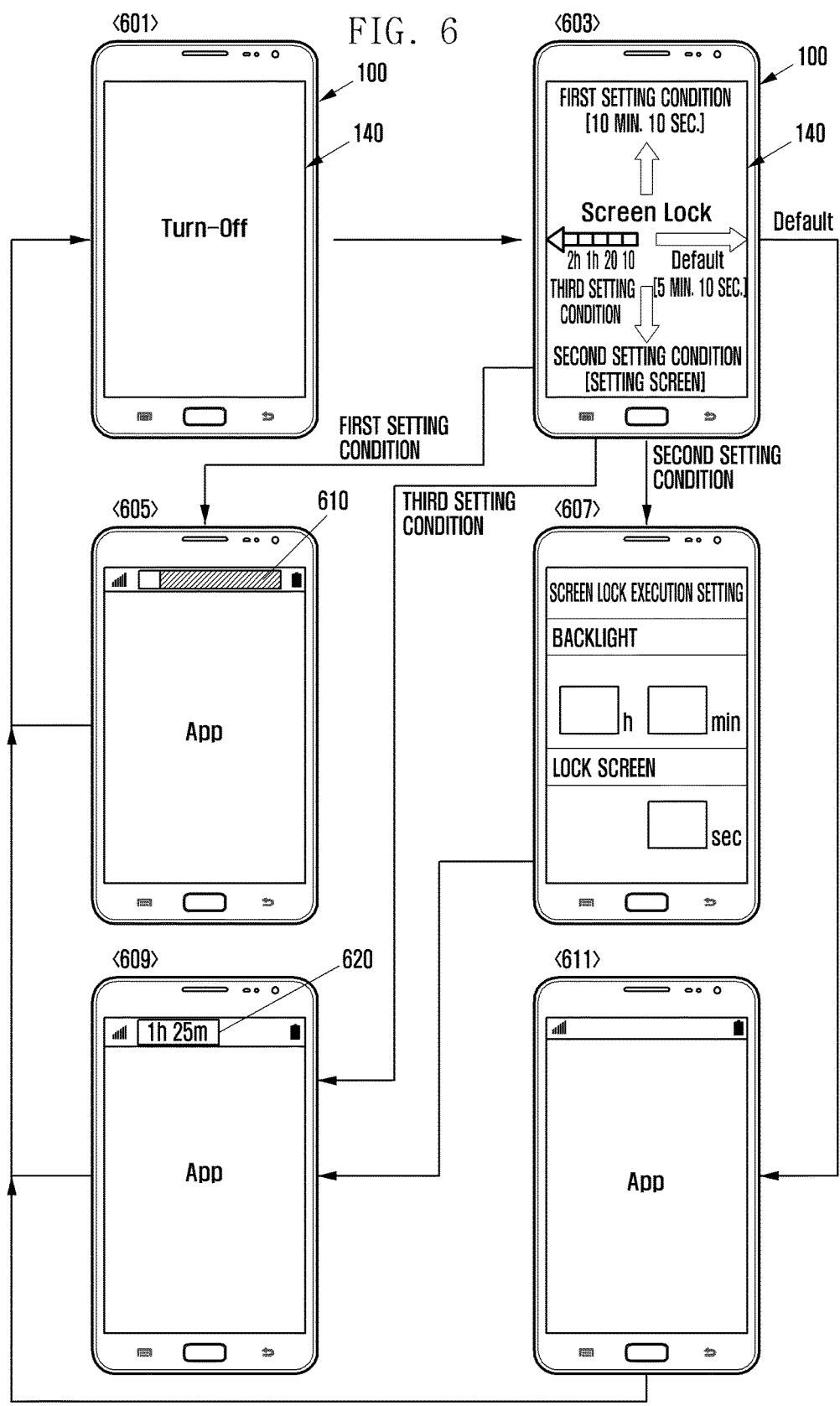
FIG. 6 is a diagram for describing one example of a display interface supporting the screen lock control function of the present disclosure.

FIG. 6 is a diagram illustrating a display interface for supporting the screen lock control function according to an example embodiment of the present disclosure.

Referring to FIG. 6, the display unit 140 of the electronic device 100 of the present disclosure may be in a state shown in screen 601 when entering the screen lock state. That is, the display unit 140 may be a state in which power supply is discontinued and the touch sensing unit 143 is inactive. The electronic device 100 may maintain a signal reception standby state for at least one key included in the input unit 120. When the controller 160 receives an input signal generated from the input unit 120, the controller 160 may perform a specific function corresponding to the received input signal. For example, when a home key input event is detected, the controller 160 may output the screen lock setting screen on the display unit 140 as shown in screen 603. The screen lock setting screen may offer a plurality of screen lock execution conditions as illustrated. When an input event corresponding to any one among the conditions suggested in the screen lock setting screen is generated, the controller 160 may drive the timer under a screen lock execution condition according to the corresponding event.

When a touch event corresponds to a first setting condition (here, the topmost setting in screen 603), for example, the controller 160 may select a screen lock execution condition value corresponding to the first setting condition and update the setting table 151 as shown in screen 605. Further, the controller 160 may output a specific application performance screen according to the screen lock release on the display unit 140. In this case, the electronic device 100 may output a first indicator 610 corresponding to the first setting condition value on a predetermined region at an upper end of the display unit 140, such as, for example, a region of a status bar. Here, the output of the first indicator 610 may be omitted if desired by a system designer. According to the first setting condition, when a requisite predetermined separate event is not detected, the screen lock execution condition continues counting down. This may be visually represented by a bar image 610 of the first indicator may be modified. Further, when a separate event is detected, the countdown and thus first indicator 610 may be reset to an initial state. The first indicator 610 may be optionally not be displayed according to the preference of the user. The first indicator 610 may also be removed when a default screen lock execution condition is selected by the output of the basic lock screen. The controller 160 may also output an indicator according to the default screen lock execution condition. In the above description, the fixed screen lock execution condition value designated by the user or arbitrarily is suggested as the first setting condition, but the present disclosure is not limited thereto. That is, the electronic device 100 may be configured to provide a screen lock setting screen including a plurality of items capable of selecting screen lock execution condition values which are fixed, arbitrary, or have different values.

When a touch event is detected corresponding to a second setting condition, such as, for example, a drag event in a downwards direction of the display seen in screen 603, the controller 160 may output a screen lock setting input screen according to the second setting condition on the display unit 140, as shown in screen 607. The screen lock setting input screen of screen 607 may include input regions capable of controlling at least one option for the display panel 141 and the touch sensing unit 143 of the display unit 140 as illustrated. For example, when the display unit 140 is formed by a liquid crystal display device, the electronic device 100 may insert an item capable of setting a turn-off time for a backlight into the screen lock setting input screen, and provide the screen lock setting input screen. Accordingly, the user may set the turn-off time of the backlight so that a specific application function is maintained without generation of a separate event through the screen lock setting input screen. Further, the user may set a touch sensing maintaining time after the turn-off time of the backlight through a screen lock item. Here, the electronic device 100 may control so as to temporarily stop a currently executed application function when the backlight is turned off. Further, when a specific input event is generated within a time for which the touch sensing is maintained, the electronic device 100 may perform the power supply to the display unit 140 and reproduce the corresponding application function. When the setting input is completed in screen 607, the controller 160 may provide screen 609 on the display unit 140.

In the meantime, the backlight is mentioned in the above description on an assumption that the display unit 140 is implemented by the liquid crystal display device, but the present disclosure is not limited thereto. That is, the "backlight" option may be altered to any option item of a display panel, which may be identically applied to a display device, such as an OLED. Further, it is described above that the checkable item for discontinuing the power supply for implementing the screen of the display unit 140 is set, but the present disclosure is not limited thereto. That is, the screen lock setting input screen may also include an item for setting a time at which a size of power of the display unit 140 is decreased.

When a touch event is detected corresponding to a third setting condition, which may be, for example, a drag event moving a touch input a predetermined distance in a leftwards direction on the displayed screen of screen 603, the controller 160 may select a screen lock execution condition according to the third setting condition, as shown in screen 609. In order to apply the third setting condition, the controller 160 may identify a direction of the touch event and a distance of the touch event. For example, when the direction of the touch event is in the leftwards direction, the controller 160 may identify the distance of the touch event. The controller 160 may adjust a screen lock execution condition value according to a length of the distance of the touch event. For example, the controller 160 may select the screen lock execution condition value, such as "10 minutes, 20 minutes, one hour, and two hours", according to the length of the distance of the touch event. When the touch event is generated in screen 603, the controller 160 may display an execution condition value set by the currently generated touch event by outputting a specific pop-up message or pop-up image. For example, when a touch drag event is generated in the leftwards direction in a predetermined region of the display unit 140, the controller 160 may display the execution condition value changed according to a distance of the corresponding drag event by a time, a predetermined bar type, or a specific screen. Accordingly, the user may variably adjust the execution condition value while performing the touch drag operation. Further, the controller 160 may output the set screen lock execution condition value on the region of the status bar as a second indicator 620. The second indicator 620 indicates the screen lock execution condition value with a number. The second indicator 620 may be used as reference information for the corresponding screen lock execution. The second indicator 620 may be counted in a state where a separate event is not generated and be set according to the generation of the event. Otherwise, the second indicator 620 may be counted regardless of the generation of the event to be ended. When a time indicated by the second indicator 620 is ended, the electronic device 100 may be changed to the screen lock state. Further, the second indicator 620 may be removed according to input control of the user. Further, the second indicator 620 may be removed by setting a default condition. That is, the screen lock execution condition values designated by the setting of the user of the present disclosure may be removed when the screen lock execution condition is changed by a default condition.

When an event corresponding to the default setting condition is generated in screen 603, the controller 160 may output a default screen on the display unit 140 as shown in screen 611. The default screen may be a screen in which a separate screen lock execution condition value is not set and to which a default screen lock execution condition value designed in a system is applied. The controller 160 may drive the timer with the default screen lock execution condition value provided by the system while performing the aforementioned process. Further, the controller 160 may control a change of the screen lock state in which a separate event is not generated before the ending of the timer.

When the condition for entering the screen lock state from the state of each screen is satisfied, screen 601 may be returned.

In the meantime, when the home key event or a specific key event is detected in the state of screen 601, the electronic device 100 may display screen 611 according to the default setting without of outputting screen 603. Further, when an input is detected from an input key of the electronic device (i.e., a first key or key event), the electronic device 100 may output screen 603, and when a second key event is generated, the controller 160 may output screen 609. Here, the first key and the second key may be designated differently according to an intention of the designer.

Further, the aforementioned first setting condition, third setting condition, and the like may be adjusted in value through one or more graphical user interface menu item. That is, the electronic device 100 may provide a menu item capable of adjusting "10 minutes and 10 seconds" of the first setting condition. Accordingly, "10 minutes and 10 seconds" registered as the first setting condition may be adjusted to "11 minutes and 3 seconds" according to an adjustment of the user. Further, the electronic device 100 may provide a menu item capable of adjusting a size of a time changed according to a moving distance of the touch event in the third setting condition. Accordingly, "10, 20, 1 h, and 2 h" may be changed to "5, 30, 1 h, and 1 h 30 m" according to an adjustment of the user.

When a touch event indicating the first setting condition is detected in screen 603, the controller 160 may identify a direction of the touch, and additionally provide the screen lock execution condition value via a pop-up message, a pop-up image, or a specific screen so the user can more easily identify the screen lock execution condition value. Further, when a touch event is detected selecting the second setting condition, the third setting condition, or the default condition, the controller 160 may provide the corresponding execution condition value through a separate pop-up window or highlight and display information.

When a request for releasing the screen lock is detected in screen 601, the electronic device 100 of the present disclosure may directly output screen 607, instead of outputting screen 603. Further, when input for corresponding input items is completed, the electronic device 100 may release the screen lock as shown in screen 609. Here, when a designated specific input event is detected, such as, for example, a sweep event, without the input of the execution condition value; or an input event for selecting the completion without the input of a separate item is generated, the electronic device 100 may also support outputting of a screen to which the default screen lock execution condition is applied, as shown in screen 611.

The basic lock screen provided by the electronic device 100 of the present disclosure may be a screen configured to set the execution condition value as the default when an event for releasing the screen lock is detected. For example, the basic lock screen provided by the electronic device 100 of the present disclosure may be a screen configured to release the screen lock when a touch event having a predetermined distance or longer is generated regardless of a direction of the touch event.

In the example in which the aforementioned screen lock execution condition value is provided on the display unit 140, the indicator is provided on the region of the status bar, but the present disclosure is not limited thereto. That is, in the present disclosure, guide information related to the screen lock execution may be output on various regions, such as a center and a lower end of the screen, as well as the region of the status bar of the screen. In this case, the guide information may be provided by a text form or a visual element. The guide information provided by the text or the image may be changed in display form thereof according to passage of a time.

The above description of FIG. 6 describes various screens supporting selection of inputs on the screen lock execution according one of the four directions, including the default setting condition. The present disclosure may also be in a form modified from the aforementioned examples, such as, for example, a form in one or more directions among the upwards, downwards, leftwards, and rightwards directions provide a default setting, and a specific setting condition is applied to the remaining directions. Here, when the touch event is generated in the remaining directions, the electronic device 100 may execute a form in which a specific fixed value set by the user is applied, in addition to the default setting value, a form in which an input setting screen for inputting a setting value is provided, as shown in screen 609, and a form in which a setting value is changed according to a moving distance of the touch drag. Further, the electronic device 100 may support selection of the screen lock execution condition value for a diagonal direction, in addition to the four directions.

Further, the above description is based on the screen lock setting condition value for changing the electronic device 100 to the screen lock state, but the aforementioned setting conditions may also include a brightness adjustment time value of a display panel. That is, as described above, the electronic device 100 of the present disclosure may support adjustment of at least one of a time value for a dimmed state of the display panel, a time to enter the power-off state of the display panel, and a time to deactivate the touch sensing unit from the screen lock release idle screen. To this end, the electronic device 100 may further provide at least one of a setting condition item for execution of the dimmed state of the display panel, a setting condition item for the execution of the power-off state of the display panel, and a setting condition item for the execution of the screen lock state in the aforementioned display interface. When the setting condition item for the execution of the screen lock state is provided, the electronic device 100 may adaptively change the dimmed state execution time and the power-off state execution time of the display panel based on a value of the setting condition. For example, the electronic device 100 may automatically detect a configuration setting a time of 10 seconds based on the screen lock state execution time as the dimmed state entrance time, and may automatically determine a time of 5 seconds prior as the power-off execution state time. The electronic device 100 may also utilize default times provided upon which to base the screen lock state execution time.

As described above, the method of controlling the screen lock according to the embodiment of the present disclosure and the electronic device 100 supporting the same may allow the user to more conveniently adjust the execution condition of the screen lock as described above.

The aforementioned electronic device 100 may further include various additional modules according to a provided form thereof. That is, where the electronic device 100 is a communication terminal, the electronic device 100 may also further include non-mentioned elements, such as a near field communication module for near field communication, an interface for transceiving data by a wired communication method or a wireless communication method of the electronic device 100, an Internet communication module for performing an Internet function by communicating with an internet network, and a digital broadcasting module performing digital broadcasting receiving and reproducing functions. It is difficult to list all of such components since they are variously modified according to a convergence trend of digital devices, but components in the same level as those of the aforementioned components may be further included in the terminal. Further, in the electronic device 100 of the present disclosure, specific components may be excluded or replaced with other components in the configuration according to a provided form thereof. This will be easily understood by those skilled in the art.

Further, the electronic device 100 according to the embodiment of the present disclosure may include, for example, all of the information communication devices, such as a Portable Multimedia Player (PMP), a digital broadcasting player, a Personal Digital Assistant (PDA), a music player (for example, an MP3 player), a portable game terminal, a smart phone, a notebook computer, a hand-held PC, and multimedia, and application devices for multimedia, including all of the mobile communication terminals operated based on communication protocols corresponding to various communication systems.

The example embodiments of the present disclosure have been disclosed in the present specification and drawings, and although specific terms are used, they are used as general terms beneficial for easily explaining the technical contents of the present disclosure, and are not intended to limit the scope of the present disclosure. It is obvious to those skilled in the art to which the present disclosure pertains that other modified embodiments on the basis of the spirits of the present disclosure besides the embodiments disclosed herein can be implemented.

What is claimed is:

1. A method of controlling a screen lock in an electronic device, comprising:
   receiving a request to release the screen lock while the electronic device is in a screen lock state;
   in response to the request, displaying on a display a screen lock setting screen enabling adjustment of at least one execution condition that the screen lock is executed;
   setting the at least one execution condition based on at least one characteristic of drag touch input on the screen lock setting screen;
   switching the screen lock state to a screen lock release state; and
   executing the screen lock in response to determining that the at least one execution condition is satisfied,
   wherein the setting the at least one execution condition comprises:
   identifying a direction of the drag touch input,
   in response to identifying that the direction of the drag touch input is a first direction, setting a predetermined condition as the at least one execution condition,
   in response to identifying that the direction of the drag touch input is a second direction, identifying a distance of the drag touch input, and
   setting the at least one execution condition based on the distance of the drag touch input.

2. The method of claim 1, further comprising displaying on the display the screen lock setting screen in response to at least one of:
   receiving the request to release the screen lock before the screen lock has been active for a predetermined amount of time, and
   receiving the request to release the screen lock when the screen lock was initiated during operation of a pre-specified application.

3. The method of claim 1, further comprising:
   displaying a basic lock release screen on the display in response to the request to release the screen lock, when the execution condition is set to a default value.

4. The method of claim 1, further comprising:
   displaying a visual guide element on the display indicating a screen timeout for the electronic device to enter the screen lock state.

5. The method of claim 1, further comprising:
   receiving a drag touch input on a touch panel of the display; and
   setting the execution condition of the screen lock based on at least a direction of the drag touch input.

6. The method of claim 5, wherein setting the execution condition of the screen lock is further based on at least one of a distance of the drag touch input, and a velocity of the drag touch input.

7. The method of claim 6, wherein the distance and the velocity each indicate a scale of the execution condition.

8. The method of claim 7, wherein the execution condition is a screen timeout to enter the screen lock state, and the scale is a length of time.

9. The method of claim 8, further comprising:
   displaying on the screen lock setting screen at least one visual graphic element enabling adjustment of at least one execution condition, the visual graphic element including at least one visual indicator correlating the distance of the drag touch input to the length of time for the screen timeout.

10. The method of claim 9, further comprising:
    displaying within the screen lock setting screen a second visual graphic element; and
    displaying a configuration menu in response to selection of the second visual graphic element allowing adjustment of at least one of a screen backlight and the length of time for the screen timeout.

11. An electronic device equipped with a screen lock, comprising:
    a display; and
    a processor configured to:
    receive a request to release the screen lock while the electronic device is in a screen lock state;
    in response to the request, display on the display a screen lock setting screen enabling adjustment of at least one execution condition that the screen lock is executed;
    set the at least one execution condition based on at least one characteristic of drag touch input on the screen lock setting screen;
    switch the screen lock state to a screen lock release state; and
    execute the screen lock in response to determining that the at least one execution condition is satisfied,
    wherein the processor is further configured to:
    identify a direction of the drag touch input,
    in response to identifying that the direction of the drag touch input is a first direction, set a predetermined condition as the at least one execution condition,
    in response to identifying that the direction of the drag touch input is a second direction, identify a distance of the drag touch input, and
    set the at least one execution condition based on the distance of the drag touch input.

12. The electronic device of claim 11, the processor further configured to:
    display on the display the screen lock setting screen in response to at least one of
    receiving the request to release the screen lock before the screen lock has been active for a predetermined amount of time, and
    receiving the request to release the screen lock when the screen lock was initiated during operation of a pre-specified application.

13. The electronic device of claim 11, the processor further configured to:
    display a basic lock release screen on the display in response to the request to release the screen lock, when the execution condition is set to a default value.

14. The electronic device of claim 11, the processor further configured to:

display a visual guide element on the display indicating a screen timeout for the electronic device to enter the screen lock state.

15. The electronic device of claim 11, the electronic device further comprising a touch panel of the display, and processor further configured to:
   receive a drag touch input on the touch panel; and
   set the execution condition of the screen lock based on at least a direction of the drag touch input.

16. The electronic device of claim 15, wherein the setting the execution condition of the screen lock is further based on at least one of a distance of the drag touch input, and a velocity of the drag touch input.

17. The electronic device of claim 16, wherein the distance and the velocity each indicate a scale of the execution condition.

18. The electronic device of claim 17, wherein the execution condition is a screen timeout to enter the screen lock state, and the scale is a length of time.

19. The electronic device of claim 18, the processor further configured to:
   display on the screen lock setting screen at least one visual graphic element enabling adjustment of at least one execution condition, the visual graphic element including at least one visual indicator correlating the distance of the drag touch input to the length of time for the screen timeout.

20. The electronic device of claim 19, the processor further configured to:
   display within the screen lock setting screen a second visual graphic element; and
   display a configuration menu in response to selection of the second visual graphic element allowing adjustment of at least one of a screen backlight and the length of time for the screen timeout.

* * * * *